United States Patent Office 3,394,196
Patented July 23, 1968

3,394,196
AROMATIC HYDROCARBON ALKYLATION
PROCESS
Derek L. Ransley, Berkeley, Mack F. Hughes, Albany, and William A. Sweeney, San Rafael, Calif.; said Ransley and said Hughes assignors to Chevron Research Company, San Francisco, Calif., a corporation of Delaware
No Drawing. Filed Dec. 15, 1965, Ser. No. 514,114
8 Claims. (Cl. 260—651)

ABSTRACT OF THE DISCLOSURE

Aromatic hydrocarbons having at least one replaceable hydrogen attached to a ring carbon atom are alkylated with $C_4$ and higher 1,2-dichloroalkanes in a liquid phase reaction catalyzed by hydrogen fluoride at temperatures in the range 50° C. to 130° C. The product is the corresponding primary chloroalkyl aromatic compound in which the ring attachment to the chloroalkane is at a carbon atom at least 3 carbon atoms distant from the chloride group.

---

This invention relates to a process for the production of novel primary chloroalkyl substituted aromatic hydrocarbons. More particularly, it relates to a novel process for the alkylation of an alkylatable aromatic hydrocarbon using a 1,2-dichloroalkane as the alkylation agent and hydrogen fluoride as the catalyst for the alkylation reaction.

Alkylated aromatic hydrocarbons are in general well known in the art and find many uses therein. The primary monochloroalkyl substituted aromatic hydrocarbons obtained in the present reaction are particularly useful for the reason that the primary chloride of the alkyl group is a useful functional group per se and one that can be readily displaced in well known organic chemical displacement reactions in which a second useful functional group is introduced into the alkyl substituted aromatic compound. For example, displacement of the chloride by bisulfite ion yields a useful primary alkyl sulfonate type surface active material.

It has now been found that aromatic hydrocarbons having at least one replaceable nuclear hydrogen atom can be alkylated by liquefiable 1,2-dichloroalkanes of the formula $$R_1R_2CH(CH_2)_nCHClCH_2Cl$$

in which $n$ is a whole number and $R_1$ and $R_2$ can be the same or different radicals and can be hydrogen or a saturated hydrocarbon radical. In the alkylation reaction a mixture of the desired alkylatable aromatic hydrocarbon, the desired 1,2-dichloroalkane and hydrogen fluoride is heated to a temperature in the range from about 50° C. to about 130° C. while maintaining the reaction system pressure sufficiently elevated to maintain hydrogen fluoride in the liquid phase, thereby alkylating the aromatic hydrocarbon and producing the corresponding monochloroalkyl derivative in which the attachment to the aromatic ring is at a carbon atom of the alkyl side chain at least 3 carbon atoms' distance from the primary chloride atom thereof. Because the reaction appears to be effected at a solution interface or possibly is limited in rate because of mass transfer requirements between liquid phases, efficient stirring of the reaction mixture is very desirable in order that practical reaction rates can be experienced.

In general, 1,2-dichloroalkanes liquefiable at a temperature within the process range, i.e., being liquids per se, having a melting point therein or soluble in the aromatic hydrocarbon, HF mixtures, are useful feeds for the process.

Aromatic hydrocarbons, in general, having at least one hydrogen atom bonded to an aromatic carbocyclic carbon atom, i.e., a nuclear bound hydrogen, and which are liquefiable, i.e., in the same sense as stated above, are alkylatable in the process. As a practical matter, benzene and naphthalene are preferred. Alkyl substituted aromatic hydrocarbons are in general more easily alkylated than the unsubstituted parent compounds. Hence, such substituted aromatics are also contemplated.

In a preferred embodiment of this invention, a molar excess of hydrogen fluoride and benzene relative to the 1,2-dichloroalkane, for example, 1,2-dichlorododecane, is charged to a stirred pressure autoclave suitable for a hydrogen fluoride liquid phase reaction system. In particular a dichloroalkane:benzene:HF mol ratio of the order of 1:10:60 is effective. The reactor is then sealed and pressured with anhydrous hydrogen chloride to a pressure (STP) in the range 1–100 p.s.i.g. With efficient stirring, the reaction mixture is then heated to about 120° C. for a period of about one hour. During the heating, hydrogen chloride is produced, and the autoclave is desirably vented through a suitable pressure relief valve in order to minimize pressure build-up, for example, a maximum pressure release valve set at 100 p.s.i.g.

At the end of the reaction period, the autoclave is cooled, the volatile gas (hydrogen chloride) is vented, and the separated hydrogen fluoride-rich catalyst phase is separated from the hydrocarbon phase. The former can be recycled to the process and the latter further processed as desired, for example, washed with aqueous carbonate solution, fresh water, dried and then distilled. The conversions and yields of the desired 1-chlorophenyldodecane are very good, i.e., extrapolated values indicate conversions at this temperature exceed 70%, and indicated yields are comparable.

Representative aromatic hydrocarbons which can be alkylated in the process are benzene, naphthalene, biphenyl, anthracene, indane, toluene, xylene, ethyl benzene, t-butylbenzene, α-t-butyl naphthalene, dodecyl benzene, cumene, phenanthrene and the like aromatics. In general preferred feeds are the lower aromatic hydrocarbons (those having less than 4 carbocyclic aromatic rings) and their inertly substituted derivatives having at least one replaceable nuclear bound hydrogen atom.

Representative 1,2-dichloroalkanes useful as alkylation agents in the process are 1,2-dichlorohexane; 1,2-dichlorododecane; 1,2 - dichloro - 4 - methylpentane; 1,2-dichloroeicosane; 1,2-dichloro-6-methylhexadecane; 1,2-dichloro-7-ethylpentadecane; 1,2-dichloro-8-cyclohexyldecane, and the like dichlorides. Preferred dichlorides are the n-1,2-dichloroalkanes because they are readily available via chlorination of the now commercially available n-1-alkenes, and their benzene chloroalkylates are useful for the preparation of biologically degradable detergents. Also preferred are the dichloroalkanes in which $R_1$ of the above formula is a lower alkyl group (less than 7 carbon atoms) $R_2$ is an n-alkyl group having from 1 to 20 carbon atoms, $n$ is a number in the range 1 to 20 and in which the total number of carbon atoms in the dichloride is less than 25. The latter dichlorides are particularly desirable because the resulting product is mainly of the formula

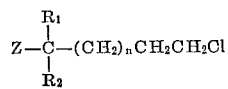

in which Z is the aromatic hydrocarbon radical.

Hydrogen fluoride is believed to be and appears to be the principal catalytic agent in the reaction. Nevertheless, and although hydrogen chloride is produced as a by-product in the alkylation, the addition initially of hydrogen chloride to the reaction system enhances the rate of reaction. A preferred aspect of the subject invention therefore includes the addition of hydrogen chloride to the system.

The useful temperature range is limited. At about 50° C. the rate is slow. It increases in the usual sense with increases in temperature, and in the range from about 80–120° C. the rate is satisfactory. When the temperature is too high, substantial degradation of the product and reactants is experienced. At about 130° C. concurrent degradation reactions become appreciable.

Pressure in general a dependent variable, for as stated, it must be sufficiently elevated to maintain the required liquid reaction system. When hydrogen chloride is added initially, somewhat higher system pressures result. No particular advantage accrues from operation of the process at pressures in excess of about 100 p.s.i.g., and there is, naturally, the disadvantageous relative cost of high pressure equipment.

Depending upon the temperature used, useful reaction periods vary in the range from about 0.1 to 50 hours, and in general results, in terms of minimization of secondary alkylation reactions, are more satisfactory when conversions are in the range from about 5–80% based upon the dichloro-feed compound.

In general it is desirable that the relative molar amounts of hydrogen fluoride and aromatic hydrocarbon substantially exceed that of the dichloride. Ratios of each of the order of at least 5 to 1 are preferable. On the other hand, extreme dilutions are impracticable. Thus the use of more than about 100 mols of HF and about 25 mols of the aromatic hydrocarbon per mol of the dichloroalkane is usually detrimental in terms of process efficiency.

The following examples are specific illustrations of the instant process and hence are not to be construed as limiting.

Example 1

1,2-dichloro-4-methylpentane and benzene in the mol ratio of 1 to 11.3, respectively, were charged to a copper pressure autoclave together with a large molar excess of hydrogen fluoride. The reactor was sealed and pressured with hydrogen chloride up to a total pressure of about 75 p.s.i.g. With stirring, the reactor and contents were heated to about 90° C. for about 5 hours. Pressure in the reactor was maintained below about 100 p.s.i.g. by means of a pressure relief valve. The cooled reactor was vented and the product worked up in the usual manner. The conversion, based on dichloride, was 16%. The product was 1-chloro-4-methyl-4-phenylpentane; yield, 79%.

1,2-dichloro-4-methyl-pentane

The novel dichloride used in the above example was produced by the addition of chlorine to 4-methyl-1-pentene.

Into a 2.5 liter jacketed turbomixer were placed 667 g. (7.94 mols, 1 liter) of 4-methyl-1-pentene and - liter of carbon tetrachloride. To this mixture was added 79.4 g. (0.3 mol) of stannic chloride. A stream of cold water was passed through the jacket maintaining the temperature of the mixture in the range 16–20° C. Into the well stirred solution a mixture of chlorine (about 675 ml./min.) and air (about 70 ml./min.) was passed via a gas port at the base of the reactor for a period of about 5 hours. The product was washed with two 500 ml. aliquots of $H_2O$, 500 ml. of 10% $NaHCO_3$, and finally 500 ml. of $H_2O$. It was dried and distilled using an efficient column at atmospheric pressure: boiling point range 161–166° C.

The dichloride was found to have the following physical characteristics:

Boiling point, 760 mm. Hg pressure, ° C. ____ 161–166
Melting point, ° C. _____ −64.7
Refractive index, $n_D^{20}$ _____ 1.4467
Density, $d_4^{20}$ _____ 1.0482
Infrared spectra carbon-chlorine stretch bands, cm.$^{-1}$:
    large _____ 670
    large _____ 740
    medium _____ 625
    medium _____ 715

Nuclear magnetic resonance spectra,

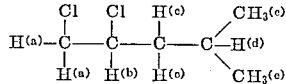

|   | P.P.M. |
|---|---|
| (a) | 3.7 |
| (b) | 4.05 |
| (c) | 1.8 |
| (d) | 1.8 |
| (e) (split by asymmetry) | 0.95 |

Example 2

As in Example 1, but using 1,2-dichlorohexane as the alkylation agent, benzene was alkylated. Into the autoclave were charged dichlorohexane, 7.7 g.; 70 ml. of HF; and 40 ml. of benzene. Dry HCl gas was again charged to a room temperature (ca 22° C.) pressure of 75 p.s.i.g. The pressure relief valve was set at 100 p.s.i.g, and the mixture was heated to 85° C. After a 6-hour reaction period, the mixture was cooled and the product recovered as before. The conversion was satisfactory, and the product was (vapor phase chromatographic analysis using suitable standards) substantially pure 1-chloro-5-phenyl-hexane.

Similar results are achievable when higher dichloroalkanes, for example, 1-2-dichloro-hexadecane, 1,2- dichloro-octane, 1,2 - dichlorononane, 1,2 - dichloro - 7-methyl-octane, 1,2-dichloro-10-methyl-undecane, and the like chlorinated hydrocarbons are used.

Surprisingly, in the alkylation of the present process no alkyl chain bonding to the alkylated aromatic hydrocarbon is detectable at the number 2 carbon atom of the 1,2-dichloride. On the contrary, a rearrangement involving hydride ion is believed to be involved in the course of the alkylation leading to attachment of the alkyl side chain to the aromatic nucleus many carbon atoms distant from the original secondary chloride bearing carbon atom. Moreover, when the 1,2-dichloroalkane contains a tertiary hydrogen atom (i.e., hydrogen bonded to a tertiary carbon atom) separated only by methylene groups from the 2-chloro-carbon atom of the dichloride, the resulting alkylation product is the corresponding substantially pure primary chlorolkane in which the tertiary hydrogen atom is displaced by the aromatic radical, for example, when 1,2-dichloro-5-methyl-hexane and benzene are used, the product is mainly 1-chloro-5-methyl-5-phenylhexane. Similar results are obtained when analogous higher and lower molecular weight feed compounds are used.

Clearly, modifications and variations of the invention as hereinbefore set forth and exemplified may be made without departing from the sense thereof. Therefore, only such limitations should be imposed as are indicated in the appended claims.

What is claimed is:

1. Process for the alkylation of an alkylatable aromatic hydrocarbon with a primary chloroalkyl group which comprises reacting a 1,2-dichloroalkane with a hydrocarbon selected from the group consisting of aromatic hydrocarbons having at least one hydrogen atom bonded to an aromatic carbocyclic carbon atom wherein said reaction is catalyzed by hydrogen fluoride at a temperature in the range from about 50° C. to about 130° C. and at a pressure sufficient to maintain hydrogen fluoride in the liquid phase, said hydrocarbon and said chloro-compound being liquefiable at a temperature within said range, and said chloro-compound being of the formula $$R_1R_2CH(CH_2)_nCHClCH_2Cl$$

wherein $n$ is a whole number, wherein $R_1$ and $R_2$ can be the same or different radicals selected from the group consisting of hydrogen, and saturated hydrocarbon radicals thereby producing the corresponding mono-alkylated aromatic derivative, said alkyl group being a primary mono-chloro substituted group having the attachment to the aromatic ring at a carbon atom of said alkyl group which is at least 3 carbon atoms distant from said primary chloride atom.

2. The process of claim 1 wherein for each mol of said dichloride in said solution there are at least 5 mols of hydrogen fluoride and at least 5 mols of said aromatic hydrocarbon.

3. The process of claim 1 wherein said alkylation reaction is accelerated by adding hydrogen chloride gas to said reaction system, said addition being sufficient to yield a system pressure in the range from about 1 to 100 p.s.i.g. at standard conditions of temperature and pressure.

4. The process of claim 1 wherein said aromatic hydrocarbon is substituted by one or more saturated hydrocarbon groups.

5. The process of claim 1 wherein $R_1$ of said dichloroalkane formula is methyl and $R_2$ is an n-alkyl radical.

6. The process of claim 1 wherein $R_1$ and $R_2$ of formula are hydrogen.

7. Process for the alkylation of benzene with a dichloroalkane selected from the group consisting of n-1,2-dichloroalkanes which are liquefiable at a temperature in the range from about 50° C. to 130° C., which comprises reacting a liquid phase mixture of said dichloroalkane, benzene and hydrogen fluoride catalyst by heating said mixture to a temperature in the range from about 50° C. to 130° C., wherein said reactants and catalyst are present in the mol ratio of about 1 to 5–25 to 5–100, respectively, thereby producing the corresponding primary mono-chloroalkylbenzene wherein the attachment of said benzene to said chloroalkane is at a carbon atom of said alkane which is at least 3 carbon atoms distant from said primary chloride atom.

8. The process as in claim 7 wherein said alkylation reaction is accelerated by adding hydrogen chloride gas to said reaction system, said addition being sufficient to yield a system pressure in the range from about 1 to 100 p.s.i.g. at standard conditions of temperature and pressure.

References Cited
UNITED STATES PATENTS

| | | | |
|---|---|---|---|
| 2,355,850 | 8/1944 | Dreisbach | 260—651 |
| 2,455,003 | 11/1948 | Frey | 260—671 XR |
| 2,501,597 | 3/1950 | Detling | |

OTHER REFERENCES

Simons, Ind. & Eng. Chem., vol. 32, 1940, pp. 178–183.
Simons et al., J. Amer. Chem. Soc., vol. 60, 1938, pp. 2952–2954.
Ogloblin et al., I, C.A., vol. 60, 10525b, c, d, 1964.
Ogloblin et al., II, C.A., vol. 61, 2967c, d, 1964.

BERNARD HELFIN, *Acting Primary Examiner.*

HOWARD MARS, *Assistant Examiner.*